United States Patent
Hutchinson

(10) Patent No.: US 11,486,992 B2
(45) Date of Patent: Nov. 1, 2022

(54) ROTATING RANGE SENSOR TO MEASURE TRUSS VERTICAL HEIGHT FOR STAGE CONFIGURATIONS

(71) Applicant: Hutchinson Creative Ltd., Huddersfield (GB)

(72) Inventor: Oliver Giles Hutchinson, Huddersfield (GB)

(73) Assignee: STAGE LIGHTING PATENTS, LLC, Windermere, FL (US)

( * ) Notice: Subject to any disclaimer, the term of this patent is extended or adjusted under 35 U.S.C. 154(b) by 249 days.

(21) Appl. No.: 16/685,673

(22) Filed: Nov. 15, 2019

(65) Prior Publication Data

US 2021/0149036 A1 May 20, 2021

(51) Int. Cl.
*G01S 13/08* (2006.01)
*G01C 9/02* (2006.01)

(52) U.S. Cl.
CPC ............... *G01S 13/08* (2013.01); *G01C 9/02* (2013.01)

(58) Field of Classification Search
CPC .................................. G01S 13/08; G01C 9/02
See application file for complete search history.

(56) References Cited

U.S. PATENT DOCUMENTS

| | | | |
|---|---|---|---|
| 4,947,354 A * | 8/1990 | Hethuin | G01R 23/167 342/122 |
| 8,822,922 B1 | 9/2014 | Scanlon et al. | |
| 9,277,105 B2 * | 3/2016 | Olsson | H04N 5/2257 |
| 11,079,306 B1 * | 8/2021 | Smith | G01N 1/2294 |
| 2008/0072439 A1 * | 3/2008 | Steffen | G01C 15/105 33/291 |
| 2013/0200022 A1 * | 8/2013 | Davis | B62B 3/10 211/85.8 |
| 2014/0009604 A1 * | 1/2014 | Hinderling | G01S 17/86 348/142 |
| 2016/0069678 A1 | 3/2016 | Grace et al. | |
| 2016/0313121 A1 * | 10/2016 | Hill | G01C 15/004 |
| 2019/0066522 A1 * | 2/2019 | Sweet, III | G08G 5/0021 |
| 2019/0154439 A1 * | 5/2019 | Binder | G01B 11/26 |
| 2019/0183386 A1 * | 6/2019 | Johnston | A61B 5/6829 |
| 2020/0209394 A1 * | 7/2020 | Mark | G01S 17/42 |
| 2020/0232794 A1 * | 7/2020 | Yanagishita | G01C 9/005 |

OTHER PUBLICATIONS

Park et al., "Wireless Laser Range Finder System for Vertical Displacement Monitoring of Mega-Trusses During Construction", Sensors, 2013, vol. 13, pp. 5796-5813.
"Accurately Align All Your Antennas", Laser Technology—Wireless, 2 pages, https://www.lasertech.com/wireless.aspx.

* cited by examiner

*Primary Examiner* — Donald H B Braswell
(74) *Attorney, Agent, or Firm* — DLA Piper LLP (US)

(57) ABSTRACT

An example of an apparatus includes a support member to support equipment above a stage. The apparatus also includes a range sensor rotatably mounted to the support member. The range sensor is to measure a distance to the stage. In addition, the apparatus includes a leveling mechanism to rotate the range sensor to measure the distance along a vertical direction. The apparatus further includes an output device to transmit the distance to a user.

16 Claims, 12 Drawing Sheets

ROTATING RANGE SENSOR TO MEASURE TRUSS VERTICAL HEIGHT FOR STAGE CONFIGURATIONS

BACKGROUND

Stages are often used in the entertainment industry and may be platforms or other areas where a performer may perform an act, such as a live theater play, a musical recital, a lecture, or other performance for entertainment or informational purposes. Modern stages are designed to provide an audience positioned around the stage with a clear view of a performer on the stage. In addition, stages may have associated peripheral devices to generate effects to enhance the performance carried out on stage. Such peripheral devices may include lighting fixtures as well as speakers and other devices such as pyrotechnic equipment, fog machines, mirrors, and other props.

BRIEF DESCRIPTION OF THE DRAWINGS

Reference will now be made, by way of example only, to the accompanying drawings in which.

DETAILED DESCRIPTION

Figure 1:
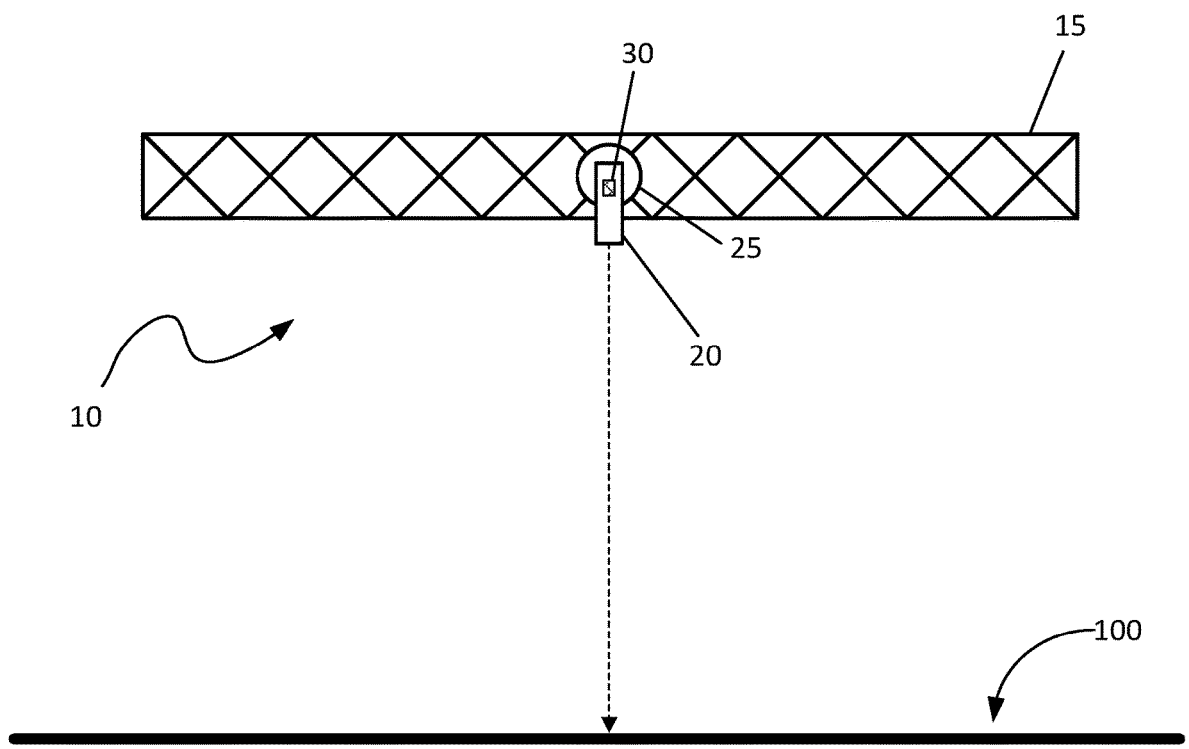
FIG. 1 is a perspective view of an example apparatus to support equipment above a stage.

As used herein, any usage of terms that suggest an absolute orientation (e.g. "top", "bottom", "up", "down", "left", "right", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Modern stages for performances, such as plays, concerts or lectures, may use multiple devices to provide sound and visual effects for the performance. Sound effects may include generating background music, or amplifying sound from on the stage. Visual effects may include lighting and laser effects. Additional effects such as pyrotechnic displays and fog machines may be also used. Some of the equipment used to provide the sound and visual effects are to be positioned above the stage to improve the generated effect. For example, a light or laser source may be positioned above the stage so that light may be directed at the stage during a performance from above to achieve an appropriate lighting effect.

Equipment positioned above or around a stage may be placed at a specific location based on a set design for the performance. In addition, the equipment may be placed at a position above the stage at varying heights and at relative positions. In order to mount and secure equipment above a stage or near a stage, a support member, such as a truss, may be positioned above the stage. In the present example, the support member may be positioned at a fixed location above the stage during an initial setup process. In other examples, the support member may be moveable to different positions either manually or automatically with the use of motors. For example, a truss may be moved from a position near the front of the stage to a position near the back of the stage between sets of a performance or during a set. The position of the truss may be measured relative to a reference point to position the equipment mounted on the truss. For example, the height of the truss above a stage reference may be measured using a tape measure or similar device hanging from the truss to the stage floor. It is to be appreciated that to carry out measurements from multiple locations of the truss, multiple tape measures may be hung from the truss. Furthermore, once the performance begins, the tape measures may be removed to avoid obstructing a view of performance and may be difficult to re-attached on the truss afterwards since the truss may be out of reach of a person. In addition, the tape measures used to set up the stage may be visible to members of the audience which may be unsightly.

An apparatus to support equipment above a stage at a known position is provided. The apparatus may include a support member, such as a truss, preinstalled with various stage equipment, such as lighting, as well as a device to measure a distance. The device to measure distance may be mounted on the support member at a specific location. The apparatus is not limited to any size or configuration and some support members may be mounted with multiple devices to measure distances. Furthermore, since the support member or truss may be mounted in any orientation, or may not be level with the ground, the apparatus may include a leveling mechanism to determine measure the vertical distance a support member is above the stage. Therefore, the height of a support member may be determined without the use of tape measures.

Referring to FIG. 1, an apparatus 10 to support equipment above a stage 100 and provide a height measurement is provided. The apparatus 10 may be configured to be suspended above the stage 100 or beside the stage 100 during a performance. The equipment to be supported by the apparatus 10 is not particularly limited and may include various stage equipment (not shown) to generate sound and visual effects. The equipment may be either pre-mounted or partially pre-mounted to the apparatus 10 to provide for a fast setup at a location where the stage 100 is to be built. Alternatively, the apparatus 10 may be free of equipment to reduce its weight which may facilitate the setup about the stage 100. Furthermore, the manner by which the apparatus 10 is supported above or near the stage 100 is not particularly limited. The apparatus 10 may be supported with various structures such as additional trusses, beams, pillars, or other temporary structures used to build the stage 100. In other examples, the apparatus 10 may be secured to permanent fixtures such as a building or natural feature where the stage 100 is to be built nearby. In the present example, the apparatus 10 include a support member 15, a range sensor 20, a leveling mechanism 25 and an output device 30.

The support member 15 is to generally support equipment above the stage 100. In particular, the support member 15 is to provide the mechanical structure and attachment points to which equipment (not shown) may be mounted. It is to be appreciated by a person of skill in the art with the benefit of this description that the support member 15 is not particularly limited and may be one of many different structures and may be dependent on the weight of equipment to be supported by the support member 15. For example, the support member 15 may be a simple beam, rod, or other elongated object to span a distance above the stage 100. In other examples, the support member 15 may be a collection of beams or rods, such as in the form of a truss.

Furthermore, it is to be understood that the support member 15 is not limited to any material and that several different types of materials are contemplated. In general, the support member 15 is to be sufficiently rigid to support equipment in place without much movement. In addition, the support member 15 may also be manufactured with materials considered to be lightweight to reduce transportation costs as well as facilitate the handling during assembly and stage construction. The support member 15 is not limited to any type of material and may be manufactured from different types of materials. The materials from which the support member 15 may be made include metal, such as steel or aluminum, wood, or plastic composite materials.

The manner by which the support member 15 is positioned above the stage 100 is also not limited and may be dependent on the mechanical weight bearing capabilities of the support member 15 as well as the structure from which it is supported. The support member 15 may be hung from a ceiling, frame or other structure surround the stage 100 using wires. In other examples, the support member 15 may rest on a beam or other member attached to structural components surround the stage 100. Furthermore, the support member 15 may be moveable relative to the stage 100. For example, the support member 15 may freely hanging on wires and moved using a rope or other positioning mechanism used to apply tension to the wires. In further examples, the support member 15 may be resting on rails or supported by a rail system where the support member 15 may be positioned by sliding along the rails (not shown). Furthermore, although the present example shows a straight support member 15, it is to be appreciated that the support member 15 may be in any shape, such as curved or have sharp angles. In some examples, the support member 15 may be a ring, a square or another shape suspended above the stage 100. Furthermore, the support member 15 may also have a joint or flexible components such its shape may be altered during setup or between sets in a performance.

The range sensor 20 is to measure a distance. The precision of the range sensor 20 is not particularly limited and may be dependent on the specific application, such as the type of equipment to be mounted on the support member 15. For example, the range sensor 20 may be able to measure a distance with an accuracy of within about 1.0 millimeters over a distance of about 2 meters to 50 meters. In other examples, the range sensor 20 may be more or less precise. The range sensor 20 is not particularly limited to any single type of device and that multiple different devices are contemplated. For example, the range sensor 20 may be an active device using laser, lidar, radar, sonar, or ultrasonic methods that involve actively transmitting a signal to a surface and measuring the reflected return signal. The distance in such devices may be determined using time of flight measurements where the speed of the signal is known and high precision timers may be used to determine the time used to travel from a transmitter back to a detector. Therefore, the distance between the stage 100 and the range sensor 20 may be determined by transmitting a signal from the range sensor 20 toward the stage 100 and measuring the reflected signal at the range sensor 20. The distance of the range sensor 20 to the stage 100 may then be calculated from the measured time between the transmission of the signal and the detection of the signal. In other examples, the range sensor 20 may also be a passive device and use other methods, such as a coincidence or stereoscopic methods, to determine a distance to markings on the stage 100.

In the present example, the range sensor 20 is mounted to the support member 15 using a rotatable mount. Accordingly, the angle of the range sensor 20 relative to the support member 15 may be adjusted to change the path along which a distance is to be measured. Therefore, the support member 15 may be positioned in various orientations such that the range sensor 20 may still be oriented to measure a substantially vertical height. The mounting mechanism for the range sensor 20 may allow the range sensor to freely rotate in a vertical plane. In other examples, the mounting mechanism may allow for three-dimensional rotation, such as a gimbal joint, to provide additional degrees of movement that will allow the support member 15 be used in more orientations that may allow the range sensor 20 to measure a substantially vertical distance.

The leveling mechanism 25 is to rotate the range sensor 20 to measure a vertical distance to the stage 100. For the discussion of the examples herein, the term vertical is to mean along the same direction as the gravitational force. Furthermore, it is to be assumed that the stage 100 is perpendicular to the vertical direction (i.e. horizontal or level). The support member 15 may be leveled during an installation or at some point during a performance, such as between sets, using a manual process carried out be a technician making measurements to determine an orientation. The manner by which the support member 15 is leveled is not limited. For example, a spirit leveling device may be used to level the support member 15 and the stage 100 such that a single measurement from the range sensor 20 may be used to determine the height of equipment attached to the support member 15 above the stage 100. However, it is to be appreciated that the stage 100 and/or the support member 15 may not be level such that the stage 100 and the support member 15 are not parallel. Therefore, the distance of equipment mounted on the support member 15 above the stage 100 may vary depending on the position on the support member 15 at which the equipment is mounted.

The manner by which the leveling mechanism 25 operates is not particularly limited. In the present example, the leveling mechanism 25 may be a rotatable mount having low rotational friction, such as a plain bearing or ball bearing. It is to be appreciated that the bearing may be lubricated to further reduce the friction between the races of the bearing. In this example, the range sensor 20 may be secured to the leveling mechanism 25 at an off center position. Since the leveling mechanism 25 is able to freely rotate, the range sensor 20 naturally move to the lowest gravitational position due to the force of gravity to self-level. Accordingly, by leveling and aligning the range sensor 20 to measure a distance along a direction radial to the center of rotation of the leveling mechanism 25 to provide measurement of the vertical distance from the range sensor 20 to the stage 100 below the range sensor 20. Therefore, the leveling mechanism 25 provides self-leveling functionality for the range sensor 20 to measure along a substantially vertical direction without aligning the range sensor 20 manually prior to each measurement. In some examples, an additional weight may be rigidly connected to the range sensor 20 to aid the leveling process and to overcome frictional forces that the weight of the range sensor 20 may not be able to overcome. It is to be appreciated that such a weight may be aligned and balanced to provide measurement of the vertical distance above the stage 100.

The output device 30 is to transmit the distance measured by the range sensor 20 to a user, such as an engineer or a technician setting up stage equipment or monitoring equipment during a performance to ensure that the equipment does not move out of spec. The manner by which the distance is transmitted is not particularly limited. In the present example, the distance is transmitted to an external device (not shown), which may be a portable electronic device, such as a tablet or a smartphone, operated by the user. Accordingly, the user may refer to the external device to obtain measurements of the apparatus 10 while making adjustments to the apparatus 10. In other examples, the output device 30 may provide a visual signal, such as a digital readout on the range sensor 20, to be read by the user. In further examples, the output device 30 may be a speaker providing an audible signal to either provide the distance, or provide a signal that the distance is within a predetermined range.

In the present example where the output device 30 transmits the distance to an external device, the output device 30 may be an electronic communications interface to transmit data to the external device. For example, the output device 30 may transmit the data over a network. The manner by which the output device 30 transmits the data over the network is not limited and may include sending an electrical signal via a wired connection. In such an example, a wire may connect the range sensor 20 to the external device such as a desktop computer. Alternatively, the output device 30 may be a wireless transmitter to send signals to other electronic devices directly. For example, the output device 30 may be to connect to another nearby device via a Bluetooth connection, radio signals or infrared signals. In other examples, the output device 30 may send signals or messages over the Internet to be retrieved or received at an electronic device located far away, such as a central control room in a different geographical location.

Figure 2A:
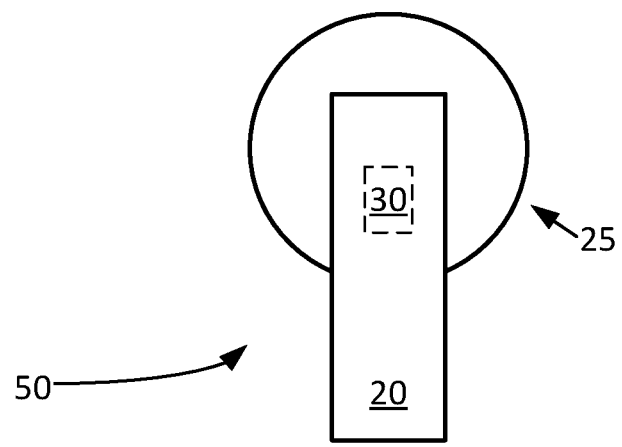
FIG. 2A is a front view of an example device to measure distance to surface.
Figure 2B:
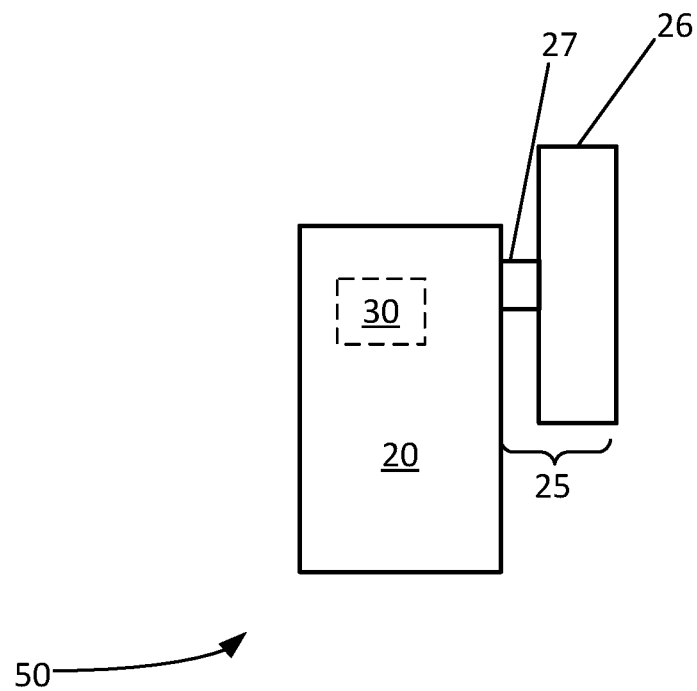
FIG. 2B is a side view of an example device to measure distance to surface.

Referring to FIGS. 2A and 2B, a device 50 to measure a distance to a surface, such as a vertical height to a stage floor, is shown in greater detail. The device 50 may be mounted above a stage 100 or beside the stage 100 during a performance. In the present example, the device 50 may be mounted onto the support member 15 previously described to form part of the apparatus 10. Alternatively, the device 50 may be mounted on other components, such as individual pieces of equipment to obtain a precise measurement unique to the equipment suspended above the stage 100. In particular, the device 50 may be used on speakers or an array of speakers where more accurate measurements are to be obtained. In the present example, the device 50 includes a range sensor 20, a mounting base 26, a rotatable member 27 and the output device 30.

The mounting base 26 is to mount the device 50 to a location at which a distance, such as the vertical height, is to be measured. The manner by which the mounting base 26 secures the device 50 at the location is not particularly limited. The mounting base 26 may be secured to any anchor point, such as a location on the support member 15 or other surface using fasteners such as screws, bolts or rivets. In other examples, the mounting base 26 may be removably attached to a surface using other mechanisms, such as magnetic coupling, suction cups, adhesives, a clip, or a quick coupling device. In other examples, the mounting base 26 may be a clamp or strap to grab onto a portion of a component. In some examples, the mounting base 26 may be secured at multiple locations and moved around to different components and locations around the stage 100. This allows the device 50 to be removed when it is not in use or after the stage equipment has been disassembled. It is to be appreciated by a person of skill that since the device 50 may include sensitive electronics, removing the device 50 during installation or transport may reduce the risk of damage to the device 50.

In the present example, the device 50 includes a rotatable member 27 connecting the range sensor 20 with the mounting base 26. The rotatable member 27 is to connect the range sensor 20 to the mounting base 26. Furthermore, the rotatable member 27 is to secure the range sensor 20 to the mounting base 26 while allowing the range sensor 20 to rotate freely about an axis of rotation through the rotatable member 27. In the present example, the rotatable member 27 may be connected to the mounting base 26 with a coupling mechanism having a low rotational friction, such as a plain bearing or ball bearing. It is to be appreciated that the rotatable member 27 and the mounting base 26 may be lubricated to further reduce the friction between each other.

In this example, it is to be appreciated that the mounting base 26 and the rotatable member 27 may operate together as the leveling mechanism 25 described above. As illustrated in FIG. 2B, the rotatable member 27 is connected to the range sensor 20 at an offset position. Therefore, the range sensor 20 naturally moves to the lowest gravitational position due to the force of gravity to measure a substantially vertical distance. Since the range sensor 20 naturally moves without active components, the leveling mechanism 25 provides a self-leveling functionality to the device 50 for the range sensor 20 to measure along a substantially vertical direction without aligning the range sensor 20 manually prior to each measurement. It is to be appreciated that in the present example, the device 50 may be balanced such that the lowest gravitational position orients the range sensor 20 to measure a vertical distance. For example, if a side of the range sensor 20, such as the left side shown in FIG. 2A were heavier, such as due to non-uniform internal components, the range sensor 20 may be tilted toward the right due to the uneven weight within the range sensor 20.

Figure 3:
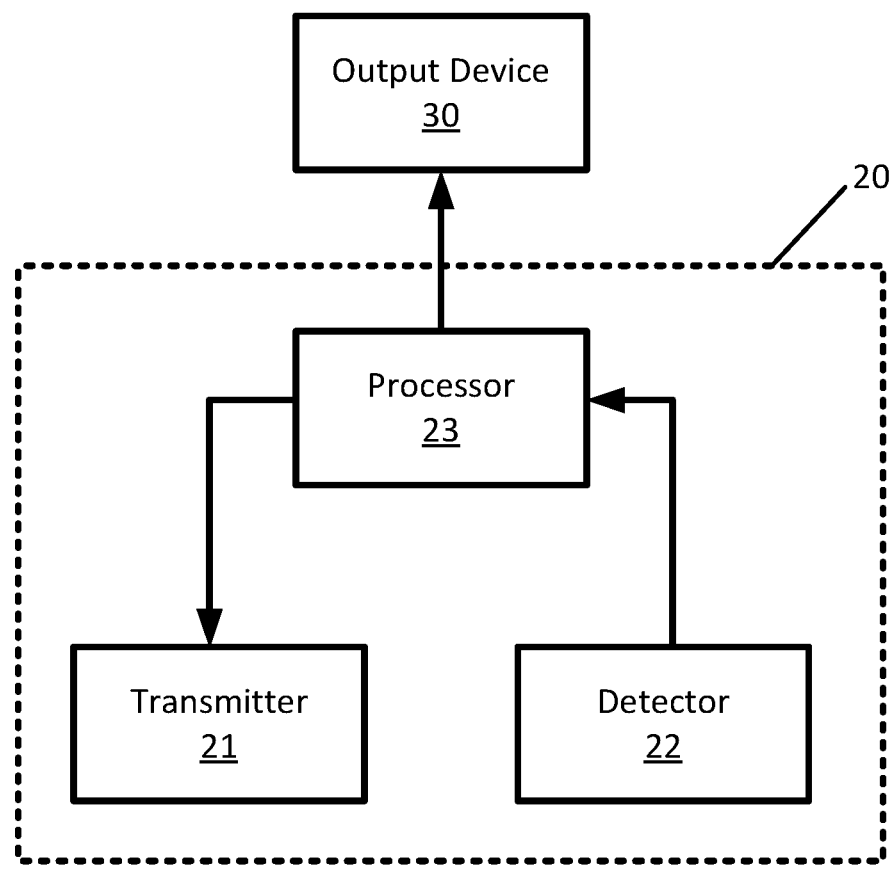
FIG. 3 is a schematic representation of the electronic components of the device of FIGS. 2A and 2B.

Referring to FIG. 3, a schematic representation of a range sensor 20 and output device 30 to measure a distance, and to transmit the distance to a user is shown in greater detail. In the present example, the range sensor 20 is an active device. Accordingly, the range sensor 20 measures the distance by transmitting a signal and measuring the response of the signal. The range sensor 20 includes a transmitter 21, a detector 22, and a processor 23.

The transmitter 21 is to transmit a signal to a surface. It is to be appreciated that the type of signal transmitted as well as the manner by which the signal is generated, such as via emission from a light source, is not particularly limited. In the present example, the transmitter 21 is a laser light source to emit a beam of light away from the range sensor 20. It is to be appreciated that the direction of the emitted light may be aligned such that the leveling mechanism 25 directs the light in a substantially vertical direction toward the stage 100. In other examples, the transmitter 21 may be another type of light emitter, such as a light emitting diode or other light source. The light from the transmitter may also be passed through optical components to filter the light and/or focus the light. In further examples, the transmitter 21 may not emit light and may instead generate an audio signal to be directed to interact with the stage surface.

In the present example, the detector 22 is to detect the reflected signal from the transmitter 21. The detector 22 is not particularly limited and is to be configured to detect the type of signal from the transmitter 21. For example, if the transmitter 21 is to emit light, the detector 22 may be a photodiode capable of detecting the reflected signal. In other examples, such as when the transmitter 21 is to transmit an audio signal, the detector 22 may be a microphone to pick up the audio signal. In some examples, the detector 22 may also include a filter to reduce the effects of background noise. In particular, if the wavelength of light emitted from the transmitter 21 is known, the detector 22 may include a filter to remove other wavelengths of light that may saturate the detector 22.

The processor 23 is to control the transmitter 21 and receive data from the detector 22. In the present example, the processor 23 may include a timing engine to measure the amount of time that has elapsed. Based on the elapsed time and known latencies in the range sensor 20 as well as the speed of the signal transmitted by the transmitter 21, it is to be appreciated by a person of skill with the benefit of this description that the distance from the range sensor 20 to the surface upon which the signal was reflected may be calculated. In particular, the processor may start the process by generating a command for the transmitter 21 to transmit light signals onto the stage 100. The processor 23 may start a timer at substantially the same time as the signal is to be transmitted. The processor 23 may then measure the elapsed time to when the signal is received at the detector 22. Assuming that the signal travelled along a substantially identical path from the transmitter 21 to a surface and from the surface back to the detector 22, the distance between the range sensor 20 and the surface may be calculated. In some examples, the latency time from the processor 23 to the transmitter 21 and the latency time from the detector 22 to the processor 23 may also be taken into consideration into the calculation of the distance.

It is to be appreciated that the processor 23 is not particularly limited. In the present example, the processor 23 may include a central processing unit (CPU), a graphics processing unit (GPU), a microcontroller, a microprocessor, a processing core, a field-programmable gate array (FPGA), an application-specific integrated circuit (ASIC), or similar. The processor 23 may execute various instructions either stored on a local memory storage unit (not shown) or received via the communications interface from an external device, such as an external device operated by a user controlling the range sensor 20 remotely. The processor 23 may execute instructions to carry out processes such as sending commands to the transmitter 21 and/or the detector 22, as well as retrieving data or logs from the transmitter 21 and/or the detector 22.

The processor 23 is in communication with the output device 30. In the present example, the output device 30 is to transmit the distance calculated by the processor 23 to an external device (not shown). Accordingly, the output device 30 may be an electronic communications interface for transmitting over a network. The manner by which the output device 30 transmits the data over the network is not limited and may include sending messages in the form of an electrical signal via a wired connection. In such an example, a wire may connect the range sensor 20 to the external device such as a desktop computer. Alternatively, the output device 30 may be a wireless transmitter to send signals to other electronic devices. In other examples, the output device 30 may be to connect to another nearby device via a Bluetooth connection, radio signals or infrared signals.

Figure 4A:
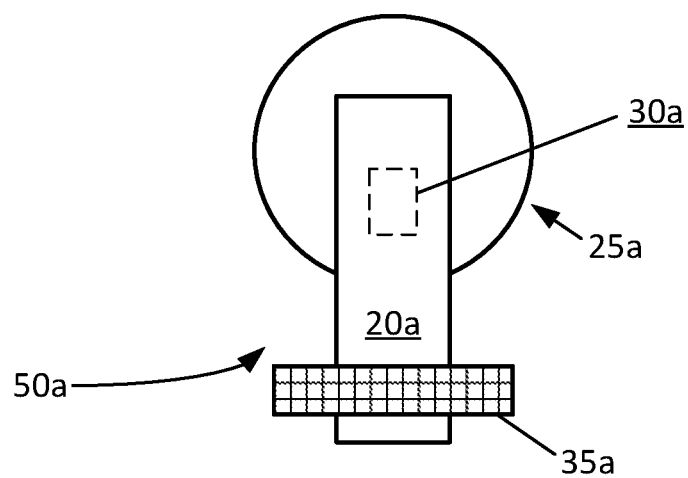
FIG. 4A is a front view of another example device with a leveling weight to measure distance to surface.
Figure 4B:
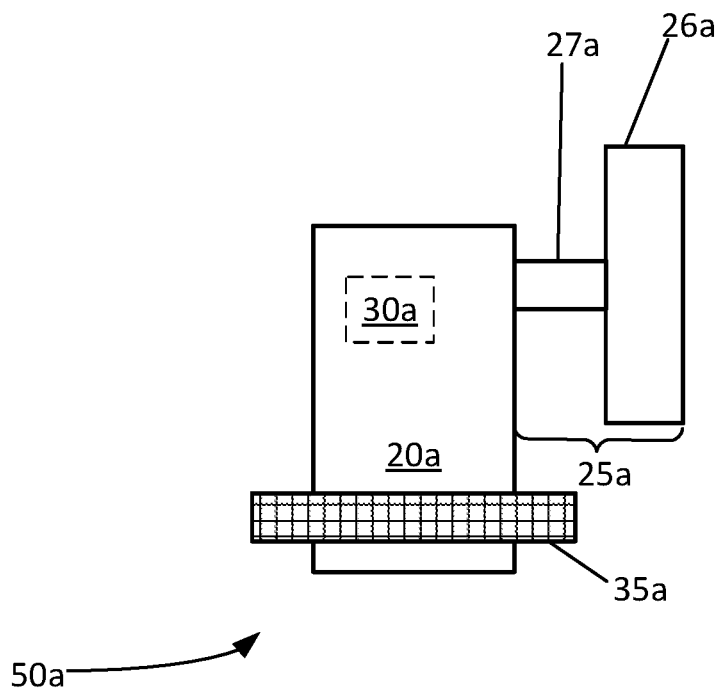
FIG. 4B is a side view of another example device with a leveling weight to measure distance to surface.

Referring to FIGS. 4A and 4B, another example of a device 50a to measure a vertical height is shown. Like components of the device 50a bear like reference to their counterparts in the device 50, except followed by the suffix "a." The device 50a may be mounted to various equipment or to a portion of a structure about a stage during a performance. For example, the device 50a may be mounted onto the support member 15 previously described to form part of the apparatus 10 and be an alternative to the device 50 described above. Alternatively, the device 50a may be mounted on other components, such as individual pieces of equipment to obtain a precise measurement unique to the equipment suspended above the stage. In the present example, the device 50a includes a range sensor 20a, a mounting base 26a, a rotatable member 27a, an output device 30a, and a weight 35a.

It is to be appreciated that in the present example, the range sensor 20a, the mounting base 26a, the rotatable member 27a, and the output device 30a may function in a substantially similar manner as the range sensor 20, the mounting base 26, the rotatable member 27, and the output device 30 described in the example above. For example, the components of the device 50a may be similar or identical to the components of the device 50. In particular, the device 50a may be a modified version of the device 50 with the addition of the weight 35a.

In the present example, it is to be appreciated that the mounting base 26a and the rotatable member 27a may operate together as a leveling mechanism 25a described above. As illustrated in FIG. 4B, the rotatable member 27a is connected to the range sensor 20a such that the weight 35a is offset from the axis of rotation. Therefore, the combined mass of the range sensor 20a and the weight 35a naturally moves to the lowest gravitational position due to the force of gravity. Since the range sensor 20a naturally moves without active components, the leveling mechanism 25a in combination with the weight 35a provides a self-leveling functionality to the device 50a for the range sensor 20a to measure along a substantially vertical direction without aligning the range sensor 20a manually prior to each measurement. Furthermore, the leveling mechanism 25a is not particularly limited and although the present example shows a planar leveling mechanism with a single degree of motion, it is to be appreciated that other mechanisms such as a gimbal joint may be used instead to provide additional degrees of freedom.

It is to be appreciated that in the present example, the combination of the range sensor 20a and the weight 35a is to be balanced such that the lowest gravitational position orients the range sensor 20a to measure along a substantially vertical direction. For example, if a side of the range sensor 20a, such as the left side were heavier or if the weight 35a was not uniformly balance on both sides the range sensor 20a may be tilted toward the right side resulting in a non-vertical measurement. By using a relatively heavier weight 35a such that the weight of the range sensor 20a is negligible by comparison, the effects of an unbalanced range sensor 20a due to the unevenly distributed internal components may be mitigated by using a uniformly balanced weight 35a.

Figure 5A:
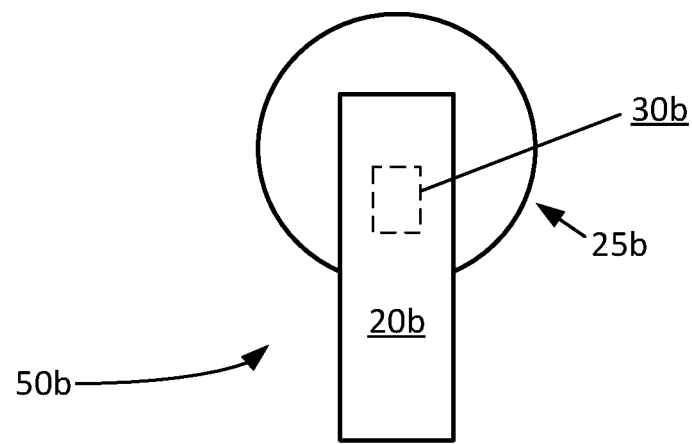
FIG. 5A is a front view of another example device with an orientation sensor to measure distance to surface.
Figure 5B:
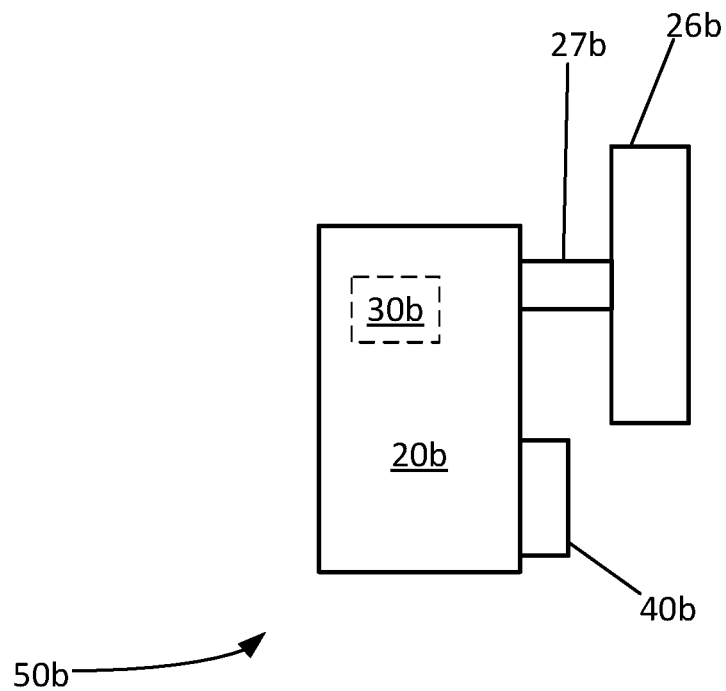
FIG. 5B is a side view of another example device with an orientation sensor to measure distance to surface.

Referring to FIGS. 5A and 5B, another example of a device 50b to measure a vertical height is shown. Like components of the device 50b bear like reference to their counterparts in the device 50, except followed by the suffix "b." The device 50b may be mounted to various equipment or to a portion of a structure about a stage during a performance. For example, the device 50b may be mounted onto the support member 15 previously described to form part of the apparatus 10 and be another alternative to the device 50 described above. Alternatively, the device 50b may be mounted on other components, such as individual pieces of equipment to obtain a precise measurement unique to the equipment suspended above the stage. In the present example, the device 50b includes a range sensor 20b, a mounting base 26b, a rotatable member 27b, an output device 30b, and an orientation sensor 40b.

It is to be appreciated that in the present example, the range sensor 20b, the mounting base 26b, the rotatable member 27b, and the output device 30b may function in a substantially similar manner as the range sensor 20, the mounting base 26, the rotatable member 27, and the output device 30 described in an example above. For example, the components of the device 50b may be similar or identical to the components of the device 50. In particular, the device 50b may be a modified version of the device 50 with the addition of the orientation sensor 40b.

In the present example, it is to be appreciated that the mounting base 26b and the rotatable member 27b may operate together as a leveling mechanism 25b described above. As illustrated in FIG. 5B, the rotatable member 27b is connected to the range sensor 20b such that the center of mass of the range sensor 20b is offset from the axis of rotation. Therefore, the range sensor 20b naturally moves to the lowest gravitational position due to the force of gravity. Since the range sensor 20b naturally moves without active components, the leveling mechanism 25b provides self-leveling functionality to the device 50b for the range sensor 20b to measure along a substantially vertical direction without aligning the range sensor 20b manually prior to each measurement. Furthermore, the leveling mechanism 25b is not particularly limited and although the present example shows a planar leveling mechanism with a single degree of motion, it is to be appreciated that other mechanisms such as a gimbal joint may be used instead to provide additional degrees of freedom. In some examples, the leveling mechanism 25b may have a frictional force that may affect the self-leveling functionality of the device 50b. In particular, if the force of rotational friction is equal to the force of gravity to rotate the range sensor 20b to the lowest gravitational position, the range sensor 20b may not measure distance along a substantially vertical direction.

The orientation sensor 40b is to measure an angle relative to the vertical direction. The orientation sensor 40b is not particularly limited and may include a wide variety of devices capable of measuring an orientation relative to the vertical direction. For example, the orientation sensor 40b may be a gyroscope. In other examples, the orientation sensor 40b may include one or more accelerometers to detect force along different directions to subsequently calculate an orientation relative to the vertical direction. In the present example, the orientation sensor 40b may be connected to the range sensor 20b. In one example, the orientation sensor 40b and the range sensor 20b may be rigidly connected such that the relative orientation between the orientation sensor 40b and the range sensor 20b does not change. Accordingly, it is to be appreciated that the orientation sensor 40b may be calibrated to provide the angle that the range sensor 20b measures a distance relative to the vertical direction.

The manner by which the orientation sensor 40b is connected to the range sensor 20b is not particularly limited. In the present example, the orientation sensor 40b may be connected with a fastener, such as a screw or bolt. In other examples, the orientation sensor 40b may be connected using a clip, or an adhesive. The orientation sensor 40b may also be connected using a magnet or other removable mechanism to allow for quick attachment and/or detachment. In such examples, the orientation sensor 40b may be an add-on component that may be used in combination with multiple range sensors.

The angle measured by the orientation sensor 40b may be used to provide a verification or quality control step in the measurement of the distance using the device 50b. For example, the angle measured may be forwarded to a processor or verification engine to verify that the range sensor 20b is measuring a distance along a substantially vertical direction. It is to be appreciated that in some cases, the range sensor 20b may be slightly misaligned. Accordingly, the processor or verification engine may be used to determine if the measured angle is within an acceptable tolerance. For example, the measured angle may be processed to determine if it is less than about 1.00°, about 2.00°, or about 5.00° depending on the tolerances. Each of these tolerances will provide an overestimation of the height of the device 50b above the stage by about 0.015%, about 0.061%, or about 0.382%, respectively. It is also to be understood by a person of skill in the art with the benefit of this description that the tolerance may be dependent on equipment relying on the precision of the height measurement. In cases where the measured angle is beyond a predetermined tolerance, the device 50b may generate an error code or other warning that the measurement may not be accurate. The error code generated may also prompt a user to manually intervene to correct the angel of the range sensor 20b, In other examples, a processor may be used to calculate a correction factor for the measurement from the range sensor 20b based on the orientation of the range sensor 20b. For example, if the orientation sensor 40b measures an angle from the vertical direction, the processor may calculate a correction factor to determine the vertical height based on trigonometric principles. Accordingly, it is to be appreciated by a person of skill in the art with that the combination of the range sensor 20b and the orientation sensor 40b may be used to determine the vertical distance from the range sensor 20b to the stage floor below accurately assuming the stage is level. Furthermore, when combined with the leveling mechanism 25b, the angle by which the range sensor 20b is off from the vertical direction may be reduced such that any variation of the levelness of the stage will also be reduced.

Figure 6A:
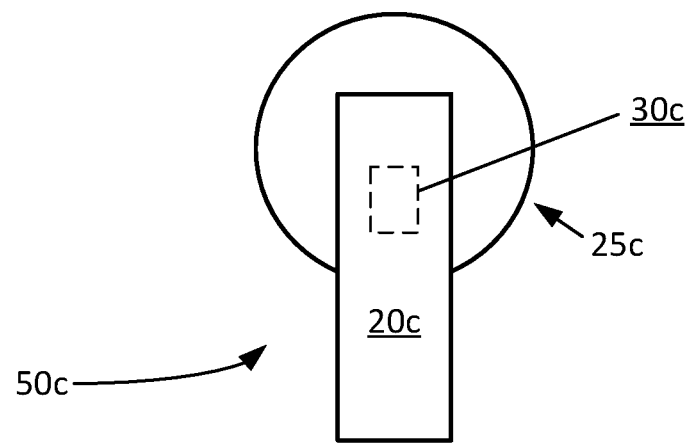
FIG. 6A is a front view of another example device with a rotation device to measure distance to surface.
Figure 6B:
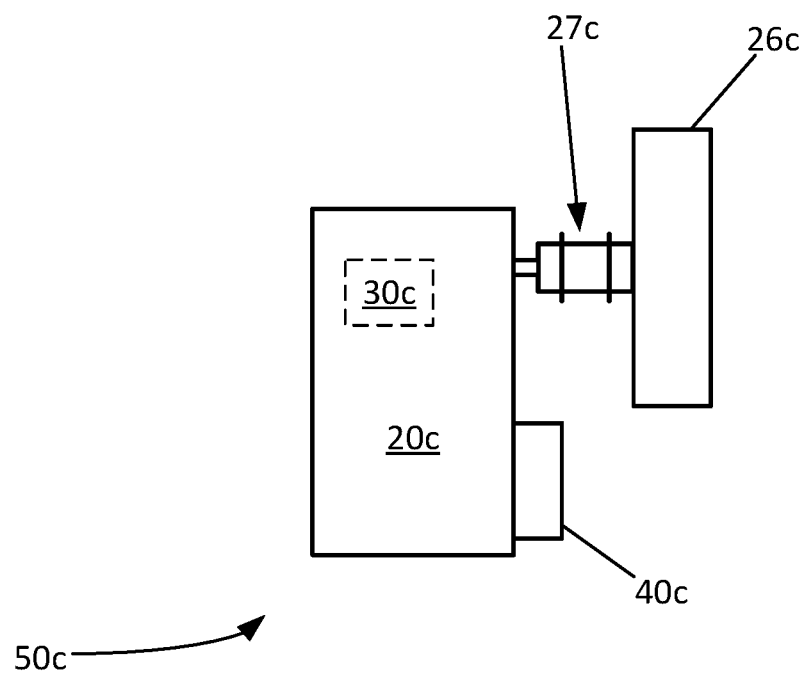
FIG. 6B is a side view of another example device with a rotation device to measure distance to surface.

Referring to FIGS. 6A and 6B, another example of a device 50c to measure a vertical height is shown. Like components of the device 50c bear like reference to their counterparts in the device 50b, except followed by the suffix "c". The device 50c may be mounted to various equipment or to a portion of a structure about a stage during a performance. For example, the device 50c may be mounted onto the support member 15 previously described to form part of the apparatus 10 and be another alternative to the device 50 described above. Alternatively, the device 50c may be mounted on other components, such as individual pieces of equipment to obtain a precise measurement unique to the equipment suspended above the stage. In the present example, the device 50c includes a range sensor 20c, a mounting base 26c, a rotation device 27c, an output device 30b, and an orientation sensor 40b.

It is to be appreciated that in the present example, the range sensor 20c, the mounting base 26c, the rotation device 27c, and the output device 30c may function in a substantially similar manner as the range sensor 20b, the mounting base 26b, and the output device 30b described in an example above. For example, some components of the device 50c may be similar or identical to the components of the device 50b. In particular, the device 50c may be a modified version of the device 50b with the substitution of the rotatable member 27b with the rotation device 27c.

In the present example, the rotation device 27c is an active component capable of rotating the range sensor 20c about an axis. The rotation device 27c is not particularly limited and may be a motor, such as a stepper motor, capable of rotating the range sensor 20c about the axis between different positions. In addition, the rotation device 27c may be capable of locking the range sensor 20c in a position such that vibrations and gravity will not change the position of the range sensor 20c. Accordingly, the rotation device 27c may be used to position the range sensor 20c to any position to carry out a distance measurement along any angle. As an example, the range sensor 20c may be moved to a horizontal position to measure a distance from a wall or other object. As another example, the range sensor 20c may measure to the distance to a plurality of reference points where the position of the device 50c relative to the stage may be triangulated.

In other examples, the rotation device 27c may be used to align the range sensor 20c to measure a distance along the substantially vertical direction based on the angle measured by the orientation sensor 40c. The rotation device 27c may receive commands to rotate the range sensor 20c by the amount that the orientation sensor 40c determines the range sensor 20c is off from the vertical direction. After the rotation, the orientation sensor 40c may perform another reading and move the range sensor 20c accordingly in response. The process may continue iteratively until the range sensor 20c is within the predetermined tolerance as measured by the orientation sensor 40c. The orientation sensor 40c may also continuously obtain measurements to ensure that the range sensor 20c remains within tolerances.

Figure 7:
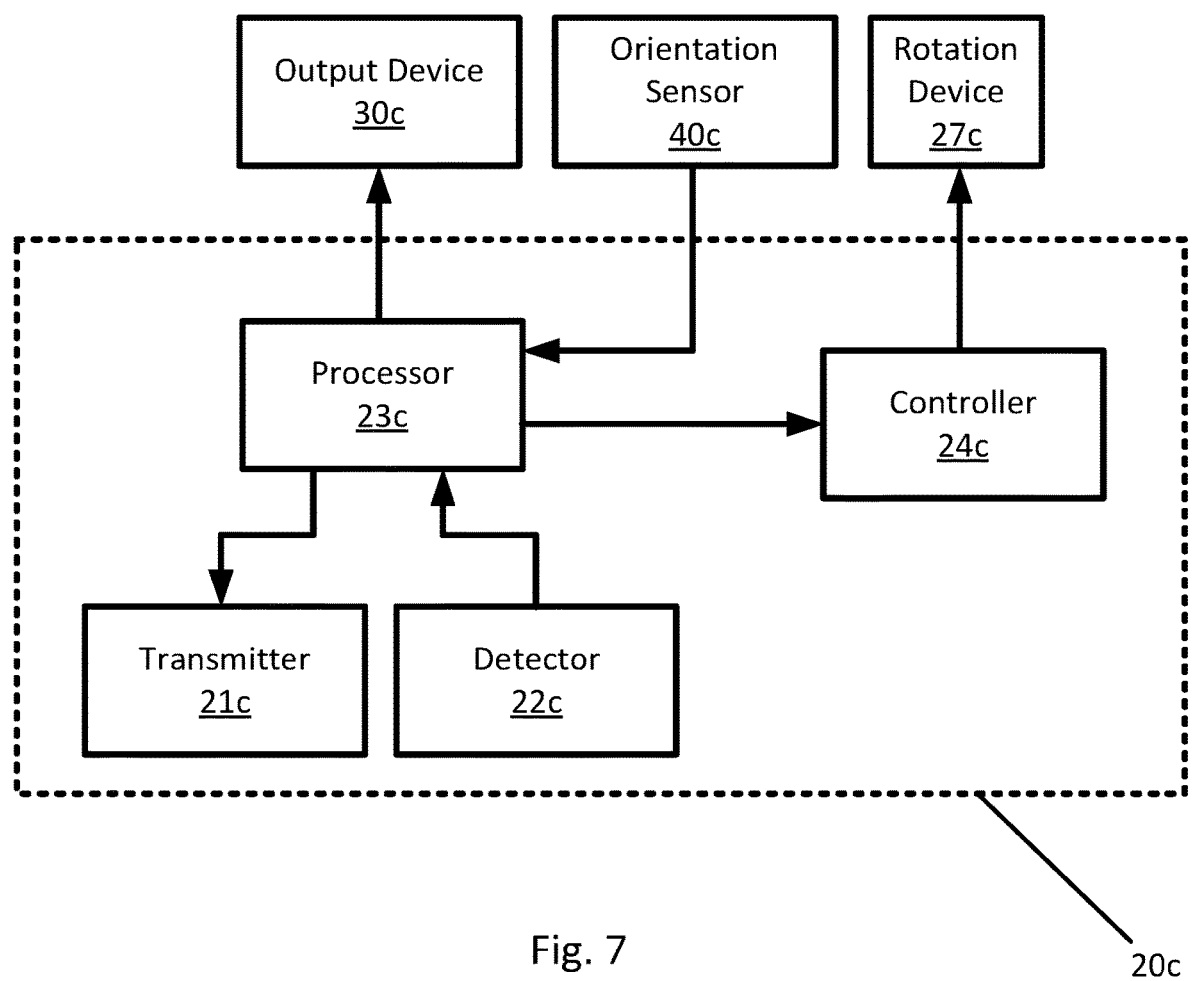
FIG. 7 is a schematic representation of the electronic components of the device of FIGS. 6A and 6B.

Referring to FIG. 7, a schematic representation of the device 50c to measure a distance and to transmit the distance to a user is shown in greater detail. In the present example, the range sensor 20c is an active device. Accordingly, the range sensor 20c measures the distance by transmitting a signal and measuring the response of the signal. In particular, the range sensor 20c includes a transmitter 21c, a detector 22c, a processor 23c, and a controller 24c. Like components of the device 50a bear like reference to their counterparts in the device 50, except followed by the suffix "c".

In the present example, the processor 23c is to control the transmitter 21c and receive data from the detector 22c. In the present example, the processor 23c may include a timing engine to measure the amount of time that has elapsed. Based on the elapsed time and known latencies in the range sensor 20c as well as the speed of the signal sent by the transmitter 21c, it is to be appreciated by a person of skill with the benefit of this description that the distance from the range sensor 20c to the surface upon which the signal was reflected may be calculated.

The processor 23c is also in communication with the orientation sensor 40c as well as a controller 24c. In the present example, the processor 23c may receive data from the orientation sensor 40c related to the orientation and alignment of the range sensor 20c. Accordingly, the processor 23c may use the data from the orientation sensor 40c to calculate an angle of the signal from the transmitter 21c relative to the vertical direction. The processor 23c may include a verification engine to verify that the angle of the signal from the transmitter 21c relative to the vertical direction is within a predetermined acceptable tolerance. In some examples, if the angle of the signal from the transmitter 21c relative to the vertical direction is out of range of the predetermined tolerance, the processor 23c may generate and transmit a command to the controller 24c to operate the rotation device 27c to move the range sensor 20c with the tolerance range.

Figure 8:
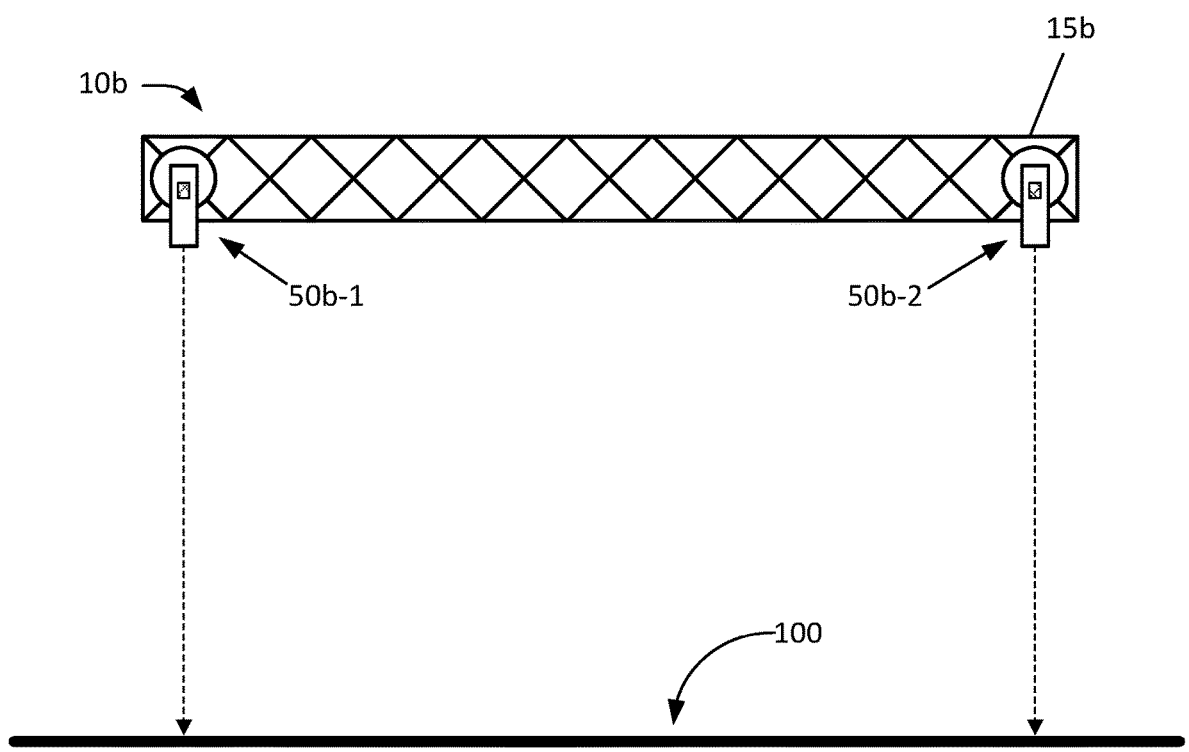
FIG. 8 is a perspective view of another example apparatus with two distance measuring devices to support equipment in a first position above a stage.

Referring to FIG. 8, another apparatus 10b to support equipment above a stage 100 and provide a height measurement is provided. The apparatus 10b may be configured to be suspended above the stage 100 or beside the stage 100 during a performance. The equipment to be supported by the apparatus 10b is not particularly limited and may include various stage equipment (not shown) to generate sound and visual effects. The equipment may be either pre-mounted or partially pre-mounted to the apparatus 10b to provide for a fast setup at a location where the stage 100 is to be built. Alternatively, the apparatus 10b may be free of equipment to reduce its weight which may facilitate the setup about the stage 100. Furthermore, the manner by which the apparatus 10b is supported above or near the stage 100 is not particularly limited. The apparatus 10b may be supported with various structures such as additional trusses, beams, pillars, or other temporary structures used to build the stage 100. In other examples, the apparatus 10b may be secured to permanent fixtures such as a building or natural feature where the stage 100 is to be built nearby. In the present example, the apparatus 10b include a support member 15b, devices 50b-1 and 50b-2, which are described above separately as device 50b.

In the present example, the stage setup may call for the support member 15b to be oriented substantially horizontal. Accordingly, the height measured by each of the devices 50b-1 and 50b-2 is to be substantially equal. Therefore, during the setup of the apparatus 10b, it is to be appreciated that the measurements from each of the devices 50b-1 and 50b-2 may be used to level the support member 15b to be horizontal above the stage 100 by making adjustments to the orientation of the support member 15b until the devices 50b-1 and 50b-2 measure the same height.

Figure 9:
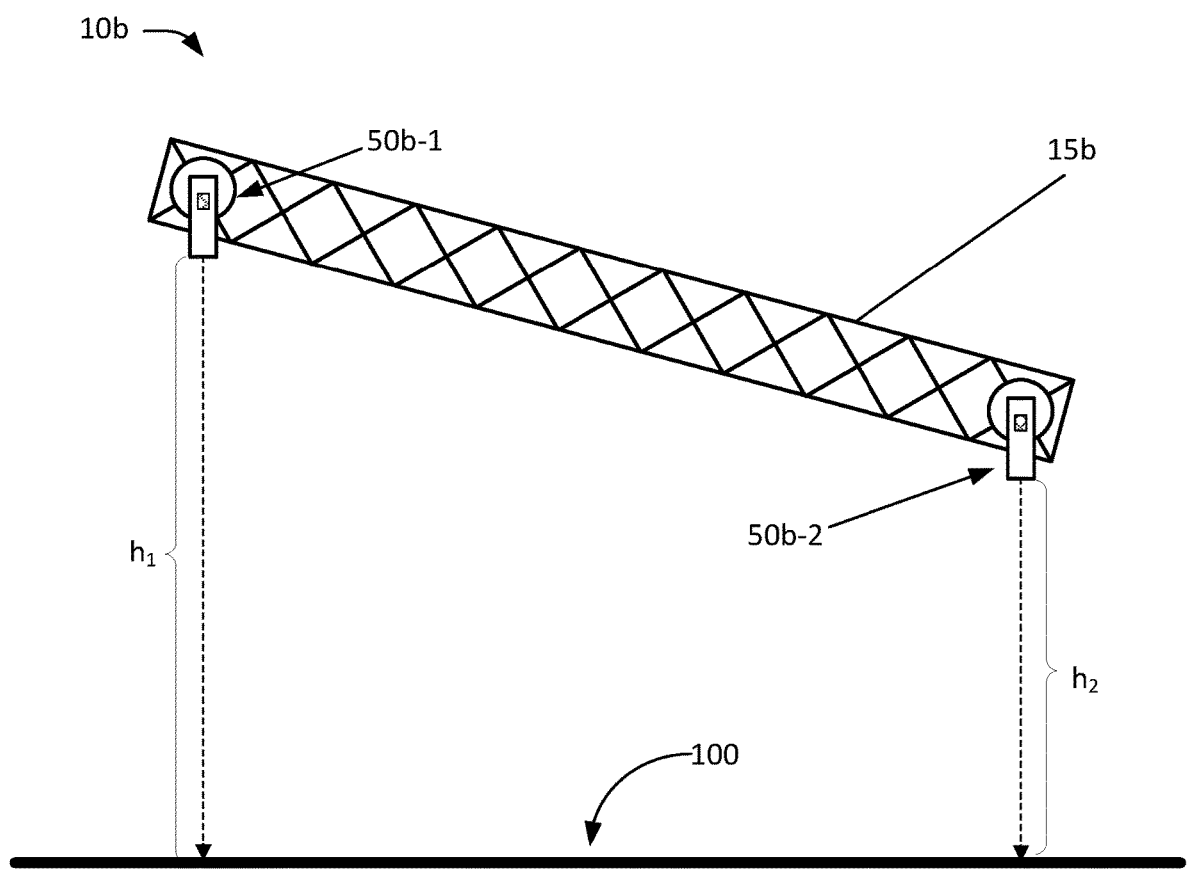
FIG. 9 is a perspective view of the example apparatus of FIG. 8 in a second position above the stage.

In addition, by providing an additional device 50b to measure the height at different points along the support member 15b, the orientation of the support member 15b may be determined if it were not level. For example, in some situations, the support member 15b may be intentionally tilted or positioned at an angle relative to the horizontal so support equipment at varying heights. This may be used to accommodate different equipment or to obtain a specific lighting effect. Therefore, the angle of the support member 15b may be obtained by measuring the height of the support member 15b above the stage 100 at different locations as shown in FIG. 9. Once the height $h_1$ measured by the device 50b-1 and the height $h_2$ measured by the device 50b-2 are determined, the angle of the support member 15b relative to the level may be calculated. In addition, the height of equipment suspended along the support member 15b may be extrapolated based on the measurements.

It is to be appreciated by a person of skill in the art with the benefit of this description that although two devices 50b are used to determine the orientation of the support member 15b, additional devices 50b may also be mounted along the support member 15b. With additional devices mounted along the support member 15b, more height measurements are provided which may be used to average any noised from a single device.

Figure 10:
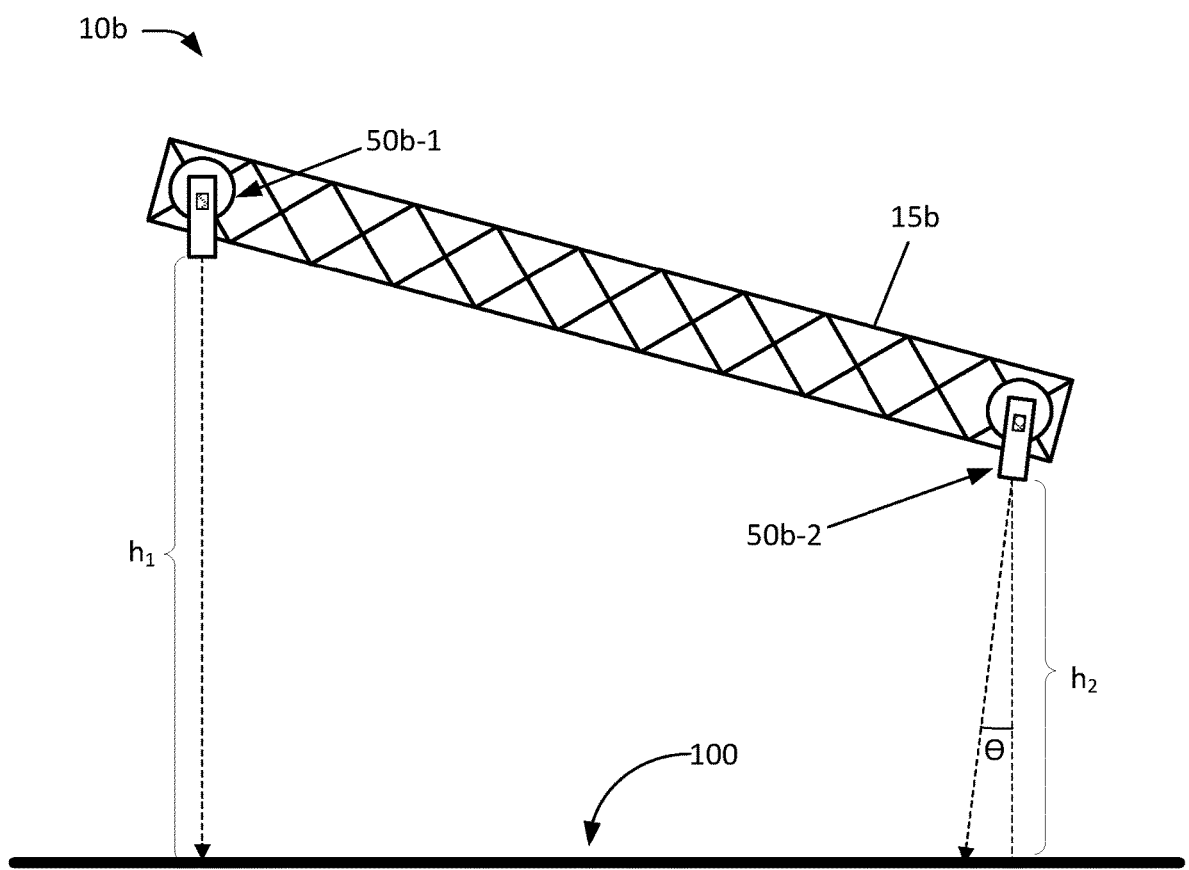
FIG. 10 is a perspective view of the example apparatus of FIG. 9 with a non-leveled distance measuring device.

Referring to FIG. 10, a misaligned device 50b-2 is shown in the apparatus 10b. The manner by which the device 50b-2 is misaligned is not particularly limited. For example, the device 50b-2 may have been damaged during transportation or the leveling mechanism 25b may have mechanically degraded over time to introduce friction resulting in a misaligned position. In other examples, the device 50b-2 may also be substituted with another device that does not include a leveling mechanism.

In this example, the device 50b-2 may measure a distance at an angle ⊖ from the vertical direction. Accordingly, the distance measured by the device 50b-2 may be longer than the actual height $h_2$ of the device 50b-2 above the stage 100. Since the angle ⊖ may be measured using the orientation sensor 40b, a correction factor may be applied to the measured distance to obtain the correct height $h_2$. Continuing with this example, it may be assumed that the distance measured by the range sensor 20b of the device 50b-2 is about 30 meters and that the orientation sensor 40b measures an angle of about 10.00° from the vertical. Accordingly, a correction factor of about 0.9848 may be applied to the measured distance to determine that the device 50b-2 is about 29.54 meters above the stage 100.

Figure 11:
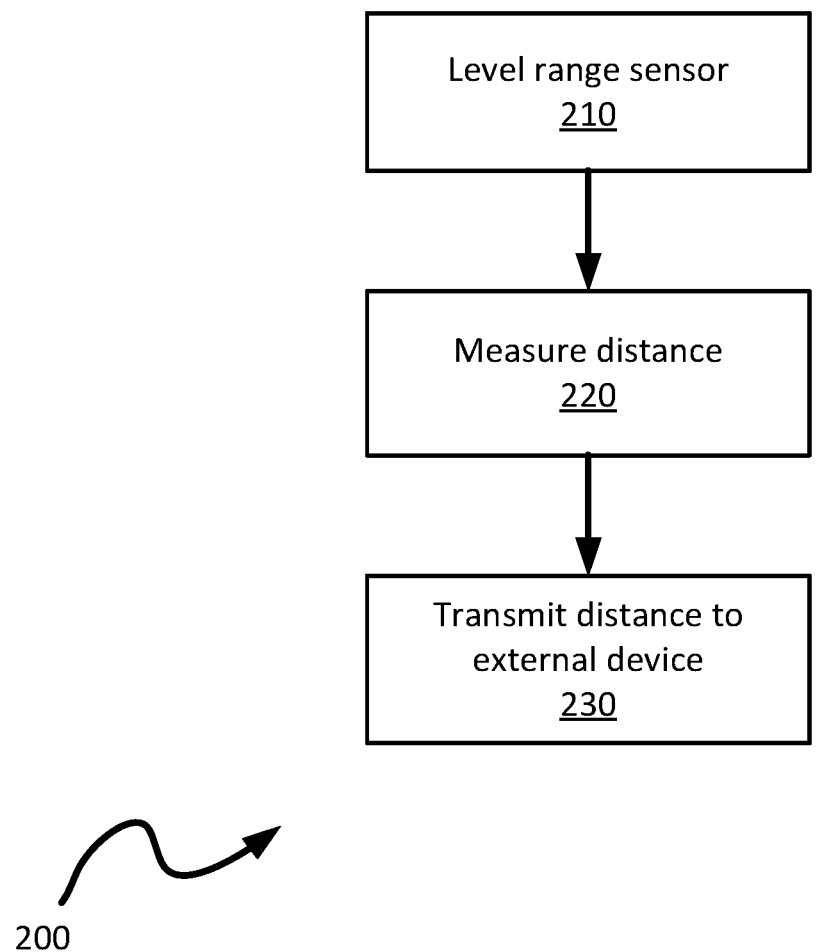
FIG. 11 is a flowchart of an example of a method of measuring a distance to surface.

Referring to FIG. 11, a flowchart of measuring the height on the apparatus 10 above the stage 100 is generally shown at 200. In order to assist in the explanation of method 200, it will be assumed that method 200 may be performed with the apparatus 10b. Indeed, the method 200 may be one way in which apparatus 10b may be configured. Furthermore, the following discussion of method 200 may lead to a further understanding of the apparatus 10b and its various components. It is to be emphasized, that method 200 may not be performed in the exact sequence as shown, and various blocks may be performed in parallel rather than in sequence, or in a different sequence altogether.

Block 210 involves leveling the range sensor 20b. It is to be appreciated that the manner by which the range sensor 20b is leveled it not particularly limited. For example, a passive leveling mechanism 25b may be used to allow the range sensor 20b to rotate to the position having the lowest gravitational potential. In this example, the range sensor 20b is to be balanced such that the lowest gravitational position will have the range sensor 20b oriented to measure a distance in a substantially vertical direction. In other examples, the range sensor 20b may be actively leveled using an iterative process involving measurements from the orientation sensor and active control of a motor to position the range sensor 20b.

In other examples, the leveling of the range sensor 20b may involve a virtual leveling process. For example, if the range sensor 20b is rigidly mounted to the support member 15b, block 210 may involve using the angle measured by the orientation sensor 40b to calculate a correction factor. Accordingly, the correction factor may be used to level the range sensor 20b virtually.

In other examples, a combination of mechanical and virtual leveling may be used in block 210. For example, if the mechanical components for leveling the range sensor 20b are unable to level the range sensor 20b within acceptable tolerances, a virtual leveling process may be applied.

Next, block 220 involves measuring the distance to a surface using the range sensor 20b. Since the range sensor 20b is to have been leveled after block 210, the distance measured by the range sensor 20b may represent the height to the nearest surface below the range sensor 20b. The manner by which the range sensor 20b measures the distance is not particularly limited. For example, block 220 may involve an active process that involves the use of laser, lidar, radar, sonar, or ultrasonic signals that are transmitted to a surface to provide a reflected return signal. The distance may be determined using time of flight measurements where the speed of the signal is known and timers may be used to determine the time used to travel from the transmitter 21b back to a detector 22b. In other examples, block 220 may involve a passive device and use other methods, such as a coincidence or stereoscopic methods, to determine a distance to markings the surface below.

Block 230 transmits the distance measured in block 220 to an external device via the output device 30b. In the present example, the output device 30b may transmit data over a network by sending messages to the external device. For example, a wire may be connected from the range sensor 20b to the external device, which may be a desktop computer or computer station monitoring the stage setup. In other examples, the output device 30b may be a wireless transmitter to send signals to other electronic devices via a wireless network. In other examples, the output device 30 may communicate with an external device directly via a Bluetooth connection, radio signals or infrared signals.

In other examples, it is to be appreciated that additional information may also be transmitted to the external device. For example, the apparatus 10b may include some processing capability to process the data measured in block 220. Therefore, the data being transmitted from the apparatus 10b may also include various identifiers to identify the device 50b as well as whether a correction factor was applied to the measurement.

Figure 12:
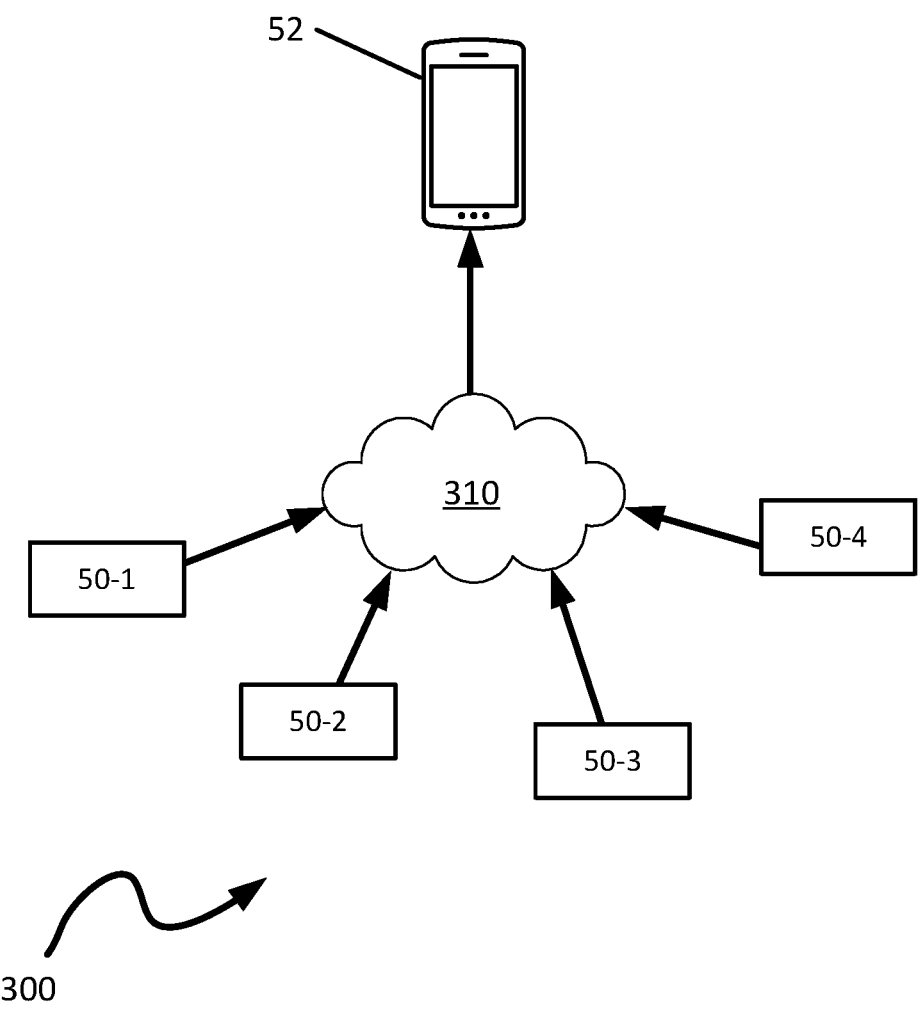
FIG. 12 is a diagram of an example system to monitor and measure heights above a stage at multiple locations.

Referring to FIG. 12, an example of a system to set up equipment for a stage is generally shown at 300. In the present example, each of a plurality of devices 50-1, 50-2, 50-3, and 50-4 is in communication with a portable electronic device 52 via the network 310. In this example, the network 310 may be any type of communications network to connect electronic devices. For example, the network 310 may be a local network that is either wired or wireless. In other examples, the network 310 may be the Internet for connecting devices across greater distances using existing infrastructure.

In the present example, the portable electronic device 52 may be a tablet or smartphone running an application to monitor height readings. However, it is to be understood that other devices are contemplated, such as a laptop or a user terminal. It is to be appreciated that by communicating with the plurality of devices 50-1, 50-2, 50-3, and 50-4, a user of the portable electronic device 52 may monitor the height of each of the plurality of devices 50-1, 50-2, 50-3, and 50-4 above a stage. Accordingly, during the setup of equipment above the stage, the plurality of devices 50-1, 50-2, 50-3, and 50-4 may be used to provide accurate measurements of height such that the trusses or other support members above the stage may be moved or adjusted to achieve a desired configuration without manually measuring each position during the setup phase, such as with a hanging tape measure or hand held range finder. Therefore a single user may direct either manual adjustments equipment above the stage. Furthermore, in performances where the configuration of various support members changes above a stage throughout the performance, the system 300 may be used to monitor the movements to ensure that the equipment is at the right location after movement.

It should be recognized that features and aspects of the various examples provided above may be combined into further examples that also fall within the scope of the present disclosure.

What is claimed is:

1. An apparatus comprising:
a support member to support equipment above a stage;
a range sensor rotatably mounted to the support member, the range sensor to measure a distance to the stage;
a leveling mechanism to rotate the range sensor to measure the distance along a substantially vertical direction;
an orientation sensor connected to the range sensor, the orientation sensor to measure an angle of the substantially vertical direction;
a processor to calculate a correction factor based on the angle, wherein the correction factor is to be applied to the distance measured by the range sensor to provide a height; and
an output device to transmit the height to a user.

2. The apparatus of claim 1, wherein the output device is a wireless transmitter.

3. The apparatus of claim 1, wherein the leveling mechanism comprises a weight rigidly connected to rotate the range sensor, wherein position the weight at a lowest gravitational position levels the range sensor.

4. The apparatus of claim 1, further comprising a verification engine, wherein the verification engine is to verify the distance measured is along the substantially vertical direction.

5. The apparatus of claim 1, wherein the leveling mechanism comprises a motor to rotate the range sensor based on the angle measured by the orientation sensor.

6. The apparatus of claim 1, wherein the orientation sensor is a gyroscope.

7. The apparatus of claim 1, wherein the orientation sensor is an accelerometer.

8. The apparatus of claim 1, further comprising a second range sensor mounted to the support member, the second range sensor to measure a second distance to the stage.

9. A method comprising:
levelling a range sensor to measure a distance along a substantially vertical direction;
measuring the distance from the range sensor to a surface along the substantially vertical direction;
measuring an angle relative to the substantially vertical direction with an orientation sensor;
calculating a correction factor based on the angle;
applying the correction factor to the distance measured by the range sensor to provide a height; and
transmitting the height to an external device.

10. The method of claim 9, wherein leveling comprises rotating the range sensor.

11. The method of claim 10, wherein the range sensor is rotated by gravity to self-level.

12. The method of claim 10, wherein the range sensor is rotated with a motor by the angle to self-level.

13. The method of claim 9, further comprising verifying the distance measured, wherein verifying the distance comprises comparing the angle against a predetermined tolerance.

14. A device comprising:
a range sensor to measure a distance to a surface, wherein the range sensor has a center of mass;
a mounting base to be secured an anchor point;
a rotatable member to connect the range sensor to the mounting base, wherein the rotatable member allows the range sensor to rotate relative to the mounting base about an axis, wherein the center of mass is offset from the axis;
an orientation sensor connected to the range sensor, the orientation sensor to measure an angle of the range sensor;
a processor to calculate a correction factor based on the angle, wherein the correction factor is to be applied to the distance measured by the range sensor to provide a height; and
an output device to transmit the height to an external device.

15. The device of claim 14, wherein the rotatable member includes a ball bearing to provide self-levelling of the range sensor with gravity to measure the distance along a substantially vertical direction.

16. The device of claim 8, wherein the orientation sensor includes a gyroscope.

* * * * *